(12) United States Patent
Riness

(10) Patent No.: US 7,306,272 B2
(45) Date of Patent: Dec. 11, 2007

(54) CYLINDER TOTE

(76) Inventor: Jim Riness, 1335 W. Hyde Rd., St. Johns, MI (US) 48879

( * ) Notice: Subject to any disclaimer, the term of this patent is extended or adjusted under 35 U.S.C. 154(b) by 0 days.

(21) Appl. No.: 11/347,333

(22) Filed: Feb. 3, 2006

(65) Prior Publication Data

US 2007/0182177 A1    Aug. 9, 2007

(51) Int. Cl.
B65G 7/12    (2006.01)
(52) U.S. Cl. ............................ 294/15; 294/92; 294/145
(58) Field of Classification Search ................. 294/12, 294/15, 26, 27.1, 91, 92, 145; 215/396
See application file for complete search history.

(56) References Cited

U.S. PATENT DOCUMENTS

| | | | |
|---|---|---|---|
| 1,247,355 A | 11/1917 | Wildberger | |
| 1,298,662 A * | 4/1919 | Chadwick | 294/2 |
| 1,352,173 A | 9/1920 | Campbell | |
| 1,700,570 A | 1/1929 | Hogberg | |
| 2,372,107 A | 3/1945 | Natho | |
| 2,806,731 A | 9/1957 | Comstock, Jr. | |
| 3,006,679 A * | 10/1961 | Gray | 294/92 |
| 3,206,202 A | 9/1965 | Evans | |
| 3,211,240 A | 10/1965 | Smitter et al. | |
| 3,520,570 A | 7/1970 | Christopher et al. | |
| 3,756,450 A | 9/1973 | Crose | |
| 4,168,025 A | 9/1979 | Bantner | |
| 4,194,868 A | 3/1980 | Walker et al. | |
| D277,080 S | 1/1985 | Gagnon | |
| 4,565,397 A | 1/1986 | Keen | |
| 4,579,237 A | 4/1986 | Gagnon | |
| D317,843 S | 7/1991 | Gagnon | |
| 5,131,670 A * | 7/1992 | Clements et al. | 280/35 |
| 5,415,445 A | 5/1995 | Van Mullen et al. | |
| 5,667,265 A | 9/1997 | Gebhard | |
| D385,788 S | 11/1997 | Risser | |
| 5,730,479 A | 3/1998 | Jansson | |
| 5,752,732 A | 5/1998 | Beaton et al. | |
| 5,957,513 A | 9/1999 | Merritt | |
| 6,086,124 A | 7/2000 | Wang | |
| D433,891 S | 11/2000 | Merritt | |
| 6,415,475 B1 | 7/2002 | Dixon | |
| 2004/0188377 A1 | 9/2004 | Balade | |
| 2005/0001440 A1 | 1/2005 | Hartwell | |

* cited by examiner

*Primary Examiner*—Dean J Kramer
(74) *Attorney, Agent, or Firm*—Paparella & Associates; Joseph A. Paparella

(57) ABSTRACT

A cylinder tote for carrying a compressed gas cylinder of the type having a flangeless neck and a valve assembly mounted atop thereof includes a handle member having a first end and an open-ended opposite end, a yoke member having a second end and an open-ended third end, the third end including a pair of legs adapted to support the valve assembly, and an intermediate member disposed between and connecting the first end of the handle member and the second end of the yoke member wherein, when the yoke member is disposed on and engages the valve assembly disposed atop the compressed gas cylinder, the cylinder tote may be used to transport the compressed gas cylinder.

6 Claims, 4 Drawing Sheets

CYLINDER TOTE

BACKGROUND OF THE INVENTION

Typically, compressed gas cylinders are manually carried by grasping the valve assembly and/or the canister itself. However, these cylindrical containers are generally large and awkward and as such, transportation of the canisters in this fashion limits both the distance and the number of cylinders that can be safely transported by a person. Moreover, the resulting stresses on the carriers arms, and especially the fingers, significantly limits the distance over which a person can carry such a canister. In addition, if to much stress is applied to the valve assembly during transportation, the cylinder itself may be damaged. As such, transportation of these compressed gas cylinders frequently results in personal injury and/or damage to the gas cylinder itself. Further yet, it is not uncommon for injury to occur to people or property that are in proximity to these cylinders, due to the difficulty of controlling the cylinder during transportation.

Heretofore, prior art devices for carrying compressed gas cylinders have typically been large, and therefore cumbersome to use. Additionally, many of these prior art devices have required the use of some form of strap or strapping, which is mounted or otherwise attached to the compressed gas cylinder, in order to utilize the carrier. As such, these prior art devices make the attachment of these carrying tools cumbersome and time-consuming.

Accordingly, a need exists for an improved compressed gas cylinder carrier which is, among other things, easy-to-use, has the ability to be installed and removed quickly, and makes the transportation of the these compressed gas cylinders safe, easy, and secure, while allowing these cylinders to be transported with less effort.

SUMMARY OF THE PRESENT INVENTION

The aforementioned drawbacks and disadvantages of these prior art compressed gas cylinders carriers have been identified and a solution is set forth herein by the inventive cylinder tote which includes a cylinder tote for carrying a compressed gas cylinder of the type having a flangeless neck and a valve assembly mounted atop thereof. The cylinder tote includes a handle member having a first end and an open-ended opposite end, and a yoke member. The yoke member has a second end, and an open-ended third end, wherein the third end includes a pair of legs which are adapted to support the valve assembly of the compressed gas cylinder when engaged thereon. Also included is an intermediate member which is disposed between and connects the first end of the handle member and the second end of the yoke member, wherein when the yoke member is disposed on and engages the valve assembly disposed atop the compressed gas cylinder, the cylinder tote may be used to transport the compressed gas cylinder.

In another aspect of the present invention, a cylinder tote for carrying a compressed gas cylinder of the type having a flangeless neck and a valve assembly mounted atop thereof includes a handle member having a first end and an open-ended opposite end. A yoke member is also included and is adapted to engage the valve assembly of a compressed gas cylinder, of the type having a flangeless neck and a valve assembly mounted atop thereof, wherein the yoke member has a second end and an open-ended third end. Also included is an intermediate member which is disposed between and connects the first end of the handle member and the second end of the yoke member, wherein when the yoke member is disposed on and engages the valve assembly disposed atop the compressed gas cylinder, the cylinder tote may be used to transport the compressed gas cylinder having a flangeless neck.

And still in another aspect of the present invention, a personal cylinder tote for carrying a compressed gas cylinder of the type having a flangeless neck and a valve assembly mounted atop thereof comprises a handle member having a first end and an open-ended opposite end. A yoke member is also included, wherein the yoke member has a second end and a generally U-shaped open-ended third end wherein further, the third end includes a pair of substantially planar legs adapted to support the valve assembly of the compressed gas cylinder when engaged thereon. Also included is a substantially planar intermediate member, the intermediate member is disposed between and connects the first end of the handle member and the second end of the yoke member in a substantially parallel relationship, and extends relatively perpendicular thereto, wherein when the yoke member is disposed on and engages a portion of the valve assembly disposed atop the compressed gas cylinder, the cylinder tote may be used to transport the compressed gas cylinder.

In yet another aspect of the present invention a method for carrying a compressed gas cylinder of the type having a flangeless neck and a valve assembly mounted atop thereof includes providing a cylinder tote including: a handle member having a first end and an open-ended opposite end; a yoke member adapted to engage the valve assembly of a compressed gas cylinder of the type having a flangeless neck and a valve assembly mounted atop thereof, the yoke member having a second end and an open-ended third end; an intermediate member, the intermediate member disposed between and connecting the first end of the handle member and the second end of the yoke member; engaging the cylinder tote with the valve assembly disposed atop the compressed gas cylinder; lifting the cylinder with the cylinder tote; and moving the compressed gas cylinder from one location to another by suspending the compressed gas cylinder from the yoke member of the cylinder tote.

Other objects, advantages, and features of the invention will become apparent upon consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosures that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. The cylinder tote of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers, and practioners in the art who are not familiar with the patent or legal terms of phraseology, to learn quickly from a cursory inspection the nature and essences of the technical disclosure of the application. Accordingly, the Abstract is intended to define neither the invention nor the application, which is only measured by the claims, nor is it intended to be limiting as to the scope of the invention in any way.

These and other objects, along with the various features, and structures that characterize the invention, are pointed out with particularity in the claims annexed to and forming a part of this disclosure. For a better understanding of the cylinder tote of the present disclosure, its advantageous and the specific objects attained by its uses, reference should be made to the accompanying drawings and descriptive matter in which there are illustrated and described the preferred embodiments of the invention.

While embodiments of the cylinder tote are herein illustrated and described, it is to be appreciated that various changes, rearrangements, and modifications maybe made therein, without departing from the scope of the invention as defined by the claims.

DETAILED DESCRIPTION OF THE PREFERRED EMBODIMENT

The best mode for caring out the invention is presented in terms of the preferred embodiment, wherein similar referenced characters designate corresponding features throughout the several figures of the drawings.

Figure 1:
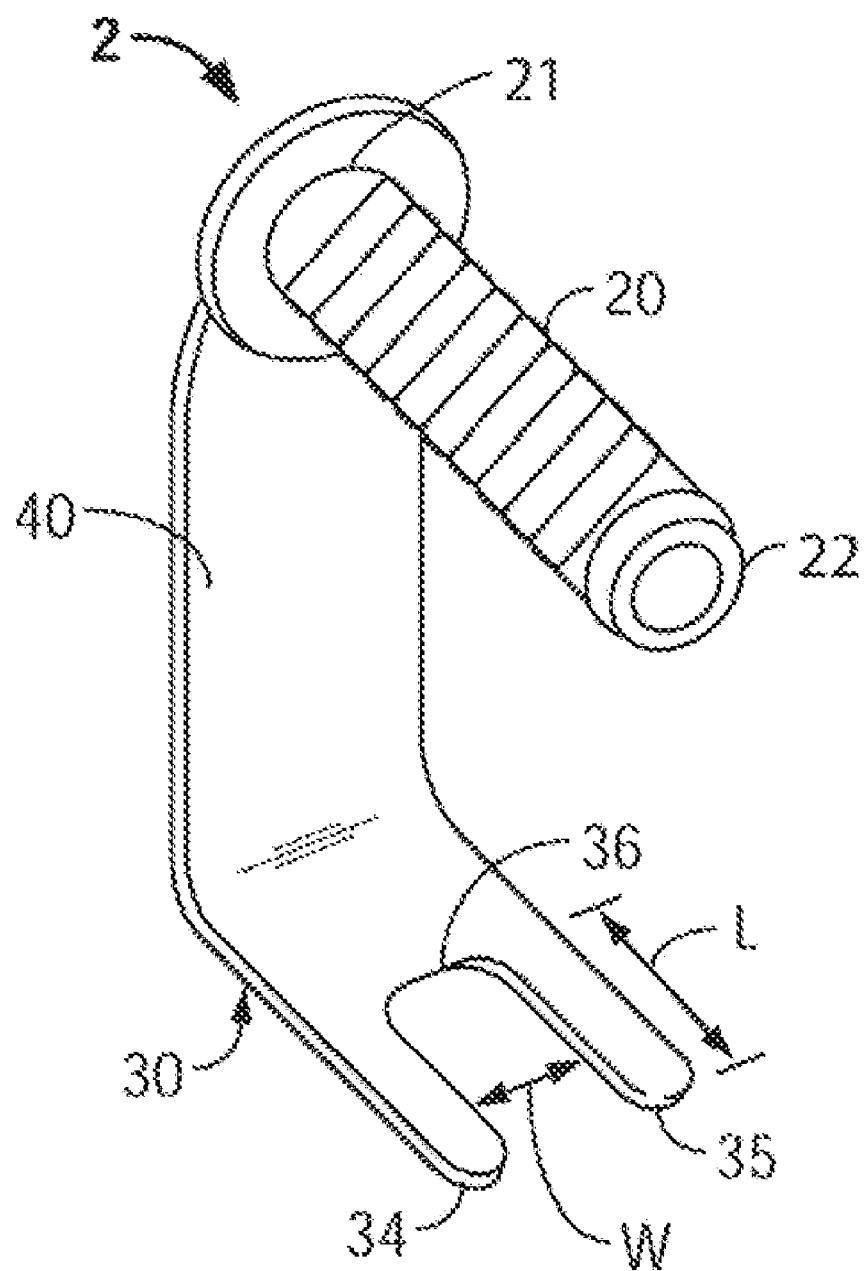
FIG. 1 is an isometric view of the cylinder tote of the present invention.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. The dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term compressed gas cylinder, is meant to refer to cylinders, bottles, tanks, and other storage devices that are typically utilized for storing compressed gasses or compressed fluids. These cylinders typically will have a cylindrical tank that forms down to a flangeless neck at the top, wherein a valve assembly is attached atop thereof. The typical valve assembly will have at least one outlet, one or more pressure relief valves, and a control lever or knob. These cylinders are utilized extensively to store, transport and supply various gasses and fluids for use in numerous industries. Of course, this is not meant to be limiting in any manner and these cylinders may have numerous other configurations, and may be used for any purposes as is generally known within the art.

Typically compressed gas cylinders are carried manually by grasping the valve assembly and/or the canister itself. These cylindrical containers are generally large and awkward, and transportation of the canisters in this fashion limits both the distance and the number of cylinders that can be transported by a person. Additionally, the resulting stresses on the arms of the person, and the fingers in particular, significantly limits the distance over which a person may carry the canister. This is further exacerbated when the canister is being carried long distances. As such, transportation of these compressed gas cylinders frequently results in personal injury and/or damage to the gas cylinder itself. Further yet, it is not uncommon for injury to occur to persons or property that are in proximity to these cylinders, due to the difficulty of controlling the cylinder during transportation.

Heretofore, prior art devices for carrying compressed gas cylinders have typically been large, and therefore cumbersome to use. Additionally, many of these prior art devices have required the use of some form of strap or strapping, which is mounted or otherwise attached to the compressed gas cylinder, in order to utilize the carrier. As such, these prior art devices make the attachment of these carrying tools cumbersome and time-consuming.

The disadvantages and drawbacks of the prior art are overcome through the cylinder tote of the present invention, wherein one preferred embodiment is disclosed in FIGS. 1-5. Referring now to FIG. 1, there is shown a cylinder tote 2 for carrying a compressed gas cylinder 4 of the type having a flangeless neck 5 and a valve assembly 6 mounted atop thereof. Cylinder tote 2 includes a handle member 20 having a first end 21 and an open-ended opposite end 22. The tote 2 also includes a yoke member 30 which is adapted to engage valve assembly 6. The yoke member 30 includes a second end 31 and an open-ended third end 32. An intermediate member 40 is disposed between and connects first end 21 of handle member 20 and second end 31 of yoke member 30, wherein when yoke member 30 is disposed on and engages valve assembly 6 disposed atop compressed gas cylinder 4, cylinder tote 2 may be used to transport compressed gas cylinder 4 having a flangeless neck 5.

Figure 2:
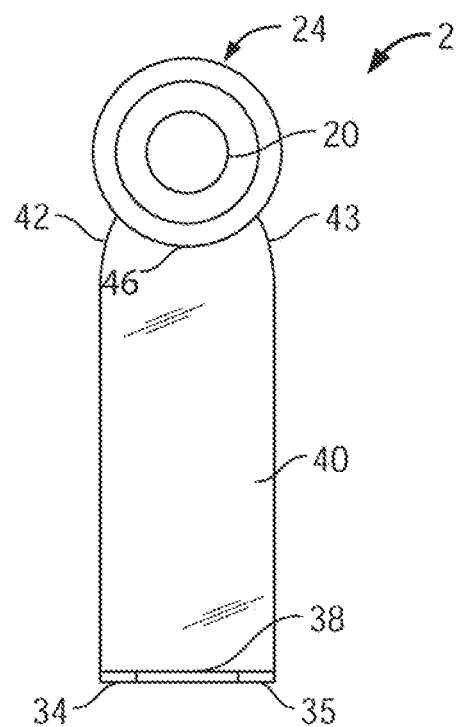
FIG. 2 is a front view of the cylinder tote of FIG. 1.
Figure 3:
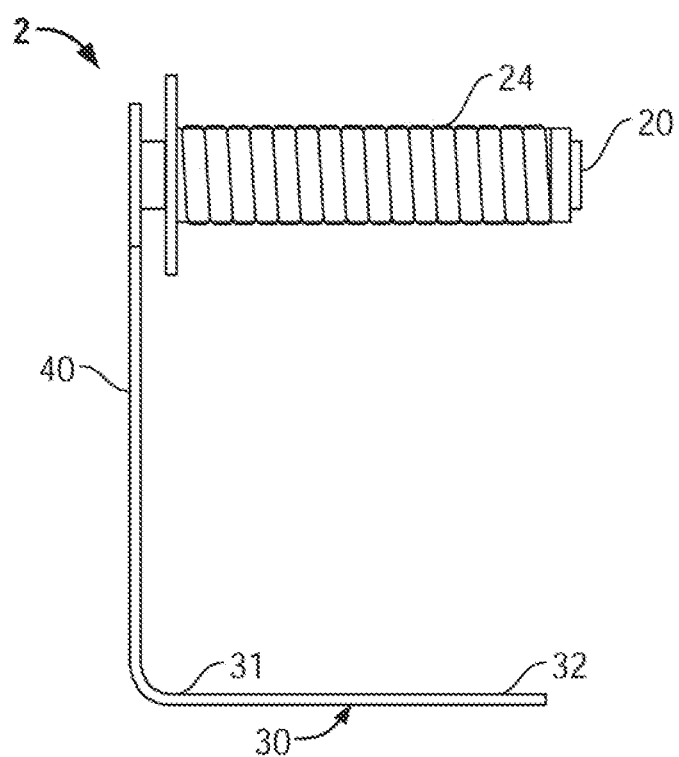
FIG. 3 is a left side view of the cylinder tote of FIG. 1.

Handle member 20 is handled or gripped by an individual to carry cylinder 4 from one location to another, as described in more detail hereinafter. Handle 20 includes a first end 21 and an open-ended opposite end 22. As illustrated, one preferred embodiment of tote 2 includes a grip disposed on and around handle 20 (FIG. 2). Grip 24 is utilized to increase the comfort of handle 20 by reducing the stresses on a users hand when transporting a cylinder, as well as increasing the associated grip of a user.

The specific configurations and features of handle member 20 may vary according to specific requirements. In one preferred embodiment, handle member 20 is generally tubular in shape and is fabricated from $1/8^{th}$ inch steel. However, the shape of handle member 20 may vary according to specific requirements, and need not be tubular. Further, although one preferred embodiment of handle member 20 is fabricated from steel, other ridged materials may be used. For example, handle member 20 may be fabricated from other metals, such as aluminum, or molded from a plastic material.

Yoke member 30 is adapted to engage valve assembly 6, includes a second end 31, and an open-ended third end 32 (FIG. 3) which includes legs 34 and 35. As best illustrated in FIG. 1, one preferred embodiment of yoke 30 includes legs 34 and 35 which are separated by an arcuate or generally U-shaped bridging portion 36, and are disposed generally parallel to one another. Legs 34 and 35 are formed to engage valve assembly 6, mounted atop the flangeless neck 5 of cylinder 4 (see generally FIGS. 4 and 5). By engaging valve assembly 6, tote 2 can then be used to transport cylinder 4. Engagement is accomplished by fabricating third end 31 to either, engage and support valve assembly 6 by having legs 34 and 35 engage underneath one of outlet port 7 and pressure relief port 8 or, by having legs 34 and 35 engage underneath valve nut 9. In either case, after engagement of legs 34 and 35, tote 2 can be used to easily lift, support and carry cylinder 4 from one location to another. Engagement is accomplished by simply sliding legs 34 and 35 underneath the respective ports 7 and 8, or nut 9. Hence a very quick, yet secure method of attaching tote 2 to cylinder 4 has been invented. In one preferred embodiment, legs 34 and 35 are formed to have a length L at least 1.5 times as long as the inside width W of bridging portion 36, thereby allowing tote 2 to securely hold cylinder 4. Additionally, yoke 30, and/or legs 34 and 35, may be sloped upwardly to assist in the retention of valve assembly 6 during transportation.

The specific configurations and features of yoke member 30 may vary according to specific requirements. In one preferred embodiment, yoke member 30 is generally rectangular in shape and is fabricated from $1/8^{th}$ inch steel by a stamping or cutting operation. However, the shape of yoke member 30 may vary according to specific requirements and need not be rectangular. Further, although one preferred embodiment of yoke member 30 is fabricated from steel, other ridged materials and fabrication methods may be used. For example, yoke member 30 may be fabricated from other metals, such as aluminum, or molded from a plastic material. In addition, although this particular embodiment of yoke member 30 is fabricated by stamping or cutting, numerous other fabrications techniques may be used that are well known in the art.

Intermediate member 40 is disposed between and connects first end 21 of handle member 20, and second end 31 of yoke member 30. Although numerous configurations may be employed, in one preferred embodiment, intermediate member 40 is disposed between and connects first end 21 with second end 31, such that handle member 20 and yoke member 30 are maintained in a substantially parallel relationship. In yet another embodiment, intermediate member 40 is planer or generally flat and is disposed between and connects first end 21 and second end 31 such that intermediate member 40 extends relatively perpendicular between handle member 20 and yoke member 30. As illustrated, intermediate member 40 is fabricated to extend relatively perpendicular between handle member 20 and yoke member 30, as well as maintain them in a substantially parallel relationship. Additionally, a portion of intermediate member 40, the portion adjacent first end 21, may include side surfaces 42 and 43 that are tapered.

The specific configurations and features of intermediate member 40 may vary according to specific requirements. In one preferred embodiment, intermediate member 40 is generally rectangular in shape and is fabricated from $1/8^{th}$ inch steel by a stamping or cutting operation. However, the shape of intermediate member 40 may vary according to specific requirements, and need not be rectangular. Further, although one preferred embodiment of intermediate member 40 is fabricated from steel, other ridged materials and fabrication methods may be used. For example, yoke member 30 may be fabricated from other metals, such as aluminum, or molded from a plastic material. In addition, although this particular embodiment of yoke member 30 is fabricated by stamping or cutting, numerous other fabrications techniques may be used that are well known in the art.

As illustrated, one preferred embodiment of cylinder tote 2 is fabricated into a one-piece configuration from $1/8^{th}$ inch steel by a stamping or cutting operation, wherein intermediate member 40 is bent to extend relatively perpendicular to yoke member 30. Handle member 20 is then welded or otherwise attached at the opposite end of intermediate member 40, such that handle member 20 and yoke member 30 are oriented in a substantially parallel relationship. However, although this particular embodiment of tote 2 is fabricated into a one-piece configuration, multiple pieces can be utilized, and assembled in various manners such as by fasteners, welding, and other techniques well known in the art. Additionally, in one preferred embodiment, a bottom 46 of handle member 40 is disposed at least 4 inches above a top 38 of yoke member 30 (FIG. 2).

While one preferred embodiment has been described, the specific characteristics of cylinder tote 2 may vary according to the specific requirements of the end user. Although one preferred embodiment utilizes a one-piece construction, cylinder tote 2 may be fabricated from numerous parts. In addition, cylinder tote 2 may be fabricated by numerous other methods such as machining or molding, and may also be fabricated from numerous materials other then sheet metal, the prime characteristic being the material's ability to support a compressed gas cylinder thereon.

By fabricating cylinder tote 2 from sheet steel utilizing stamping, folding and welding operations, a very economical cylinder tote has been developed which is simple, and yet very strong. In addition, cylinder tote 2 may be further enhanced by utilizing various finishes to provide a durable and protective finish. Further, a rubberized coating may be disposed on various parts of cylinder tote 2 to protect the valve assembly as well as increase grip.

Figure 4:
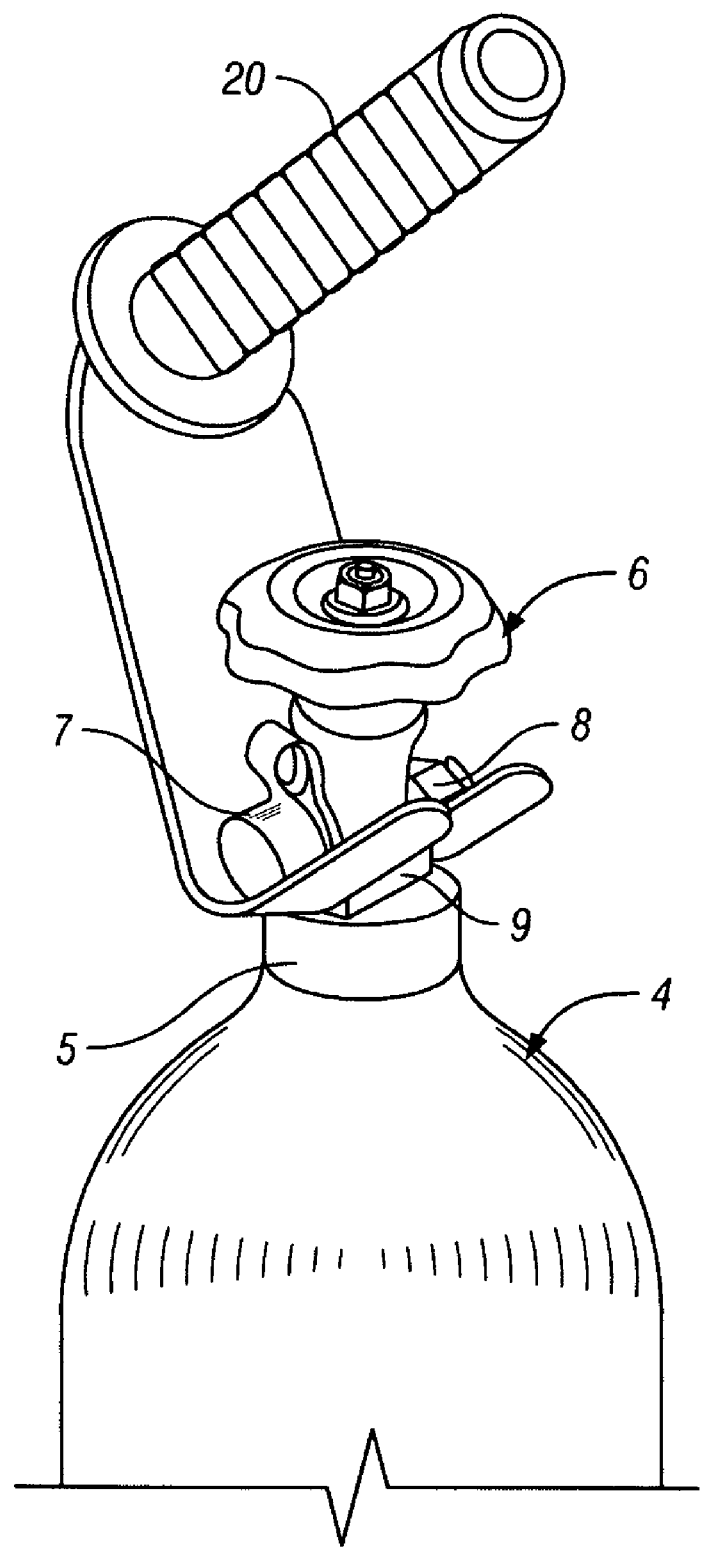
FIG. 4 is an isometric view of the cylinder tote of FIG. 1 installed on a compressed gas cylinder in an pre-use state.
Figure 5:
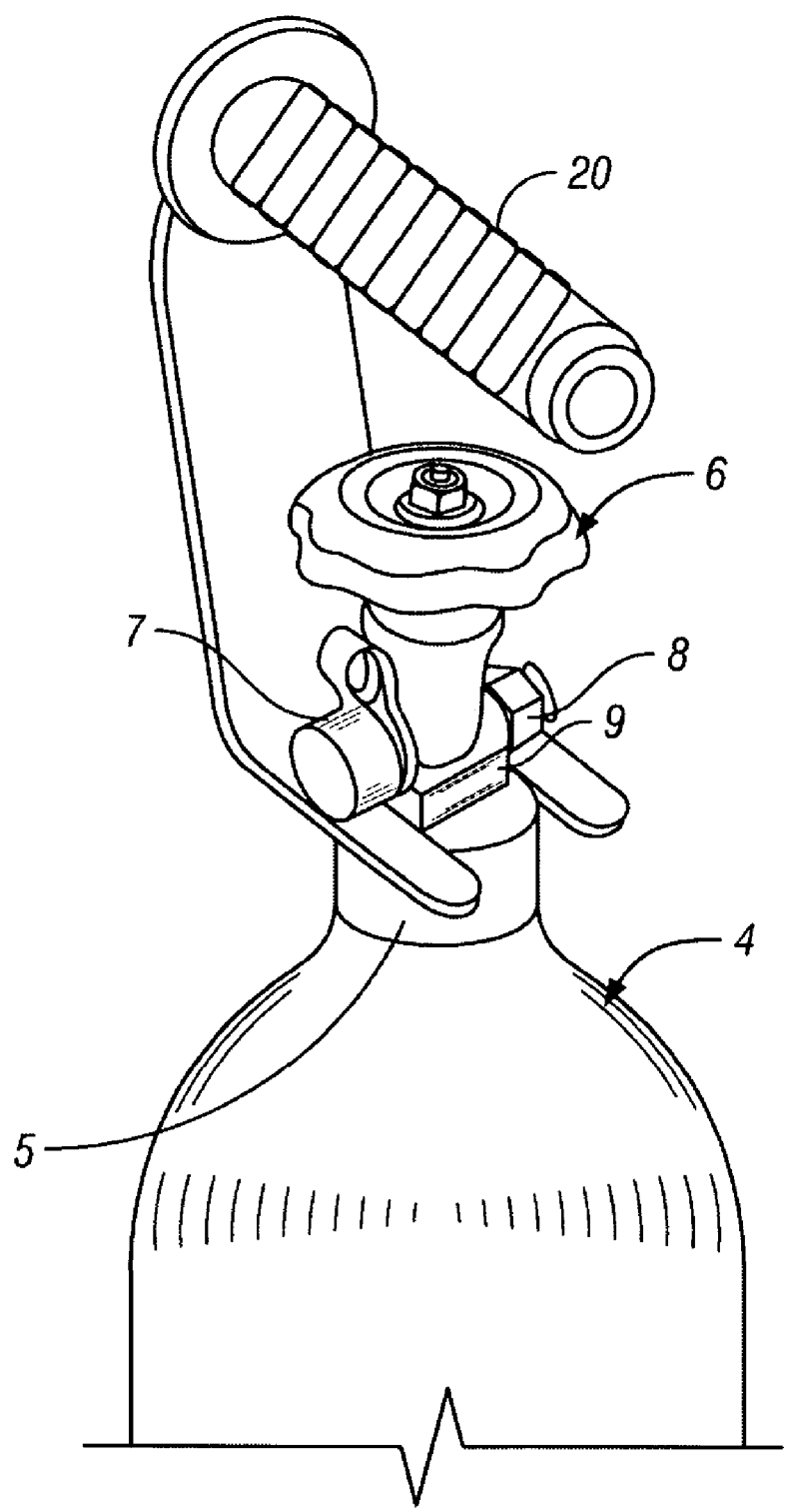
FIG. 5 is an isometric view of the cylinder tote of FIG. 1 installed on a compressed gas cylinder in a ready-to-use state.

As best illustrated by FIG. 4, cylinder tote 2 may be used to carry or transport compressed gas cylinders via legs 34 and 35 which are formed to engage valve assembly 6 mounted atop the flangeless neck 5 of cylinder 4. Engagement is easily accomplished via two preferred methods. The first is to fabricate third end 31 such that the distance W between legs 34 and 35 is less than the outside dimension from outlet port 7, to pressure relief port 8. As such, each leg 34 and 35 may be slid underneath one of each, outlet port 7 or pressure relief port 8, so that when cylinder tote 2 is lifted upwardly, cylinder 4 is supported by cylinder tote 2 via legs 34 and 35. Another preferred embodiment supports cylinder 4 by fabricating legs 34 and 35 such that the distance W between them is less than the outside dimension of valve nut 9. As such, each leg 34 and 35 may be slid underneath an edge of valve nut 9, so that when cylinder tote 2 is lifted upwardly, cylinder 4 is supported thereby. In another preferred embodiment, legs 34 and 35 are formed to have a length L at least 1.5 times as long as the inside width W of bridging portion 36, thereby allowing tote 2 to securely hold cylinder 4 while discouraging cylinder 4 from slipping off. Hence a very quick, yet secure, method of attaching tote 2 to cylinder 4 has been invented.

Advantageously, the cylinder tote 2 of the present invention is efficiently fabricated while being engineered to support heavy loads. Consequently, the embodiments of the preferred invention disclosed herein reveal a compressed gas cylinder tote which is easy to use, inexpensive to fabricate, robust, and can prevent injury to persons who carry these cylinders, as well as prevent damage to the cylinders themselves.

The solutions offered by the invention herein have thus been attained in an economical, practical, and facile manner. To whit, a novel cylinder tote which is cost effective, easily installed, strong, and aesthetically pleasing has been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to appreciated that various changes, rearrangements, and modifications may be made therein, without departing from the scope of the invention as defined by the claims.

The invention claimed is:

1. A cylinder tote for carrying a compressed gas cylinder of the type having a flangeless neck and a valve assembly mounted atop thereof, the cylinder tote comprising:
   a handle member having a first end and an open-ended opposite end;
   a yoke member, the yoke member having a second end and an open-ended third end, the third end including a pair of legs adapted to support the valve assembly of the compressed gas cylinder when engaged thereon;
   an intermediate member, the intermediate member disposed between and connecting the first end of the handle member and the second end of the yoke member;
   wherein when the yoke member is disposed on and engages the valve assembly disposed atop the compressed gas cylinder, the cylinder tote may be used to transport the compressed gas cylinder; and
   the intermediate member disposed between and connecting the first end of the handle member and the second end of the yoke member is substantially planar and extends relatively perpendicular therebetween.

2. A cylinder tote for carrying a compressed gas cylinder of the type having a flangeless neck and a valve assembly mounted atop thereof, the cylinder tote comprising:
   a handle member having a first end and an open-ended opposite end;
   a yoke member adapted to engage the valve assembly of a compressed gas cylinder of the type having a flangeless neck and a valve assembly mounted atop thereof, the yoke member having a second end and an open-ended third end;
   an intermediate member, the intermediate member disposed between and connecting the first end of the handle member and the second end of the yoke member;
   wherein when the yoke member is disposed on and engages the valve assembly disposed atop the compressed gas cylinder, the cylinder tote may be used to transport the compressed gas cylinder having a flangeless neck; and
   the intermediate member disposed between and connecting the first end of the handle member and the second end of the yoke member is substantially planar and extends relatively perpendicular therebetween.

3. A personal cylinder tote for carrying a compressed gas cylinder of the type having a flangeless neck and a valve assembly mounted atop thereof, the cylinder tote comprising:
   a handle member having a first end and an open-ended opposite end;
   a yoke member, the yoke member having a second end and a generally U-shaped open-ended third end, the third end including a pair of substantially planar legs adapted to support the valve assembly of the compressed gas cylinder when engaged thereon;
   a substantially planar intermediate member, the intermediate member disposed between and connecting the first end of the handle member and the second end of the yoke member in a substantially parallel relationship, and extending relatively perpendicular thereto;
   wherein when the yoke member is disposed on and engages a portion of the valve assembly disposed atop the compressed gas cylinder, the cylinder tote may be used to transport the compressed gas cylinder.

4. The cylinder tote according to claim 3, wherein:
   the third end of the yoke member is formed to be disposed beneath the nut of the valve assembly so that the cylinder may be supported thereby.

5. The cylinder tote according to claim 3, wherein:
   the third end of the yoke member is formed to engage both an outlet port and the pressure relief port of the valve assembly so that the cylinder may be supported thereby.

6. The cylinder tote according to claim 3, wherein:
   the pair of legs are separated by an bridging portion and are disposed generally parallel to one another;
   wherein the legs have a length at least 1.5 times as long as an inside width of the bridging portion, so as to securely hold the compressed gas cylinder of the type having a flangeless narrow neck.

* * * * *